(12) United States Patent
Alshinnawi et al.

(10) Patent No.: US 11,088,910 B2
(45) Date of Patent: Aug. 10, 2021

(54) EFFICIENT METHOD FOR MANAGING AND ADDING SYSTEMS WITHIN A SOLUTION

(71) Applicant: Lenovo Enterprise Solutions (Singapore) Pte. Ltd., Singapore (SG)

(72) Inventors: Shareef Fathi Alshinnawi, Apex, NC (US); Gary David Cudak, Wake Forest, NC (US); John Mark Weber, Wake Forest, NC (US); Joseph Francis Herman, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 1237 days.

(21) Appl. No.: 15/054,035

(22) Filed: Feb. 25, 2016

(65) Prior Publication Data

US 2017/0250864 A1    Aug. 31, 2017

(51) Int. Cl.
*G06F 15/16* (2006.01)
*H04L 12/24* (2006.01)
*H04L 12/26* (2006.01)

(52) U.S. Cl.
CPC ........ *H04L 41/082* (2013.01); *H04L 41/0883* (2013.01); *H04L 43/0817* (2013.01)

(58) Field of Classification Search
CPC ............. H04L 41/082; H04L 41/0883; H04L 43/0817
See application file for complete search history.

(56) References Cited

U.S. PATENT DOCUMENTS

| | | | | |
|---|---|---|---|---|
| 8,285,141 B1* | 10/2012 | Crowe | ............... | H04J 14/0256 398/45 |
| 2004/0039892 A1* | 2/2004 | Goldschmidt | ............ | G06F 9/52 711/170 |
| 2006/0047793 A1* | 3/2006 | Agrawal | ............ | H04L 41/0843 709/221 |
| 2008/0028236 A1* | 1/2008 | Capps | .................... | G06F 1/206 713/300 |

(Continued)

OTHER PUBLICATIONS paessler.com, "PRTG Manual: Failover Cluster Configuration," May 9, 2015, pp. 1-5, retrieved from https://web.archive.org/web/20150509044939/http://www.paessler.com/manuals/prtg/failover_cluster_configuration.

(Continued)

*Primary Examiner* — Padma Mundur (57) ABSTRACT

A method includes: determining a configuration of one or more networked hardware components; determining a usage level associated with one or more of the networked hardware components; determining a functional category of one or more of the networked hardware components based at least in part on the configuration of the one or more networked hardware components and the usage level associated with the one or more networked hardware components; and one or more of: outputting a suggested configuration of one or more of the networked hardware components based on the determined functional category of the one or more networked hardware components; and configuring of one or more of the networked hardware components based on the determined functional category of the one or more net- (Continued)

worked hardware components. Corresponding systems and computer program products are also disclosed.

20 Claims, 4 Drawing Sheets

(56) References Cited

U.S. PATENT DOCUMENTS

| | | | | |
|---|---|---|---|---|
| 2009/0310165 | A1* | 12/2009 | Olsson | H04L 41/0816 358/1.15 |
| 2010/0107155 | A1* | 4/2010 | Banerjee | G06F 8/60 717/177 |
| 2013/0080619 | A1* | 3/2013 | Assuncao | G06F 9/45558 709/224 |
| 2013/0205297 | A1* | 8/2013 | Shimogawa | G06F 9/45558 718/1 |
| 2017/0235512 | A1* | 8/2017 | Ruchita | G06F 17/30091 711/170 |

OTHER PUBLICATIONS

Akka, "Cluster Usage," Sep. 17, 2015, pp. 1-17, retrieved from https://web.archive.org/web/20150917142545/http://doc.akka.io/docs/akka/snapshot/scala/cluster-usage.html.

brightcomputing.com, "Node Provisioning," Sep. 8, 2015, pp. 1-2 retrieved from https://web.archive.org/web/20150908054908/http://www.brightcomputing.com/Linux-Cluster-Node-Provisioning.

stackflow.com, "Node.js setting up environment specific configs to be used with everyauth," May 10, 2015, pp. 1-4 https://web.archive.org/web/20150510031308/http://stackoverflow.com/questions/8332333/node-js-setting-up-environment-specific-configs-to-be-used-with-everyauth.

* cited by examiner

EFFICIENT METHOD FOR MANAGING AND ADDING SYSTEMS WITHIN A SOLUTION

FIELD OF THE INVENTION

The present invention relates to configuring computer systems in a network environment, and more particularly, this invention relates to improving the function of network environments such as data processing clusters by determining appropriate configuration parameters, firmware and/or software to apply to various different types of components coupled to the network environment.

BACKGROUND

Conventionally, a network environment such as a compute cluster coupled to one or more other components (e.g. servers, workstations, switches, and storage devices) must be configured by a system administrator. The configuration may include the system administrator determining a type of the various components and manually applying configuration parameters, firmware and/or software to the components based on the determined component type.

However, this user-controlled process is prone to errors and resulting inefficiency in the overall network environment. For instance an administrator may install improper software and/or firmware, install suboptimal combinations of firmware and/or software (e.g. incompatible or only partially compatible versions on different components of a same type), and/or misconfigure operational parameters of the various components.

In addition, even if a network environment is appropriately configured at initialization, many real-world implementations of network environments are supplemented with additional or different (e.g. upgraded) components to address evolving needs of the enterprise, replace malfunctioning components, etc. Each addition or replacement of a component represents another opportunity for erroneous configuration by the system administrator.

Misconfiguring even a single component within the network environment frequently results in data processing, storage, and/or transfer errors, creates input/output (I/O) bottlenecks, and generally detriments the efficiency of operation for the network environment as a whole. Misconfiguration is particularly problematic in the context of jobs being processed in a distributed manner, or are otherwise simultaneously necessary or utilized for multiple components of a network environment.

Accordingly, it would be beneficial to provide systems, methods, computer program products and the like which avoid the problems associated with manual network environment configuration controlled exclusively by the user.

SUMMARY

In one embodiment, a computer program product includes: a computer readable medium having stored thereon computer readable program instructions configured to cause a processor of a computer system to: determine a configuration of one or more networked hardware components; determine a usage level associated with one or more of the networked hardware components; determine a functional category of one or more of the networked hardware components based at least in part on the configuration of the one or more networked hardware components and the usage level associated with the one or more networked hardware components; and one or more of: output a suggested configuration of one or more of the networked hardware components based on the determined functional category of the one or more networked hardware components; and configure of one or more of the networked hardware components based on the determined functional category of the one or more networked hardware components.

In another embodiment, a method includes: determining a configuration of one or more networked hardware components; determining a usage level associated with one or more of the networked hardware components; determining a functional category of one or more of the networked hardware components based at least in part on the configuration of the one or more networked hardware components and the usage level associated with the one or more networked hardware components; and one or more of: outputting a suggested configuration of one or more of the networked hardware components based on the determined functional category of the one or more networked hardware components; and configuring of one or more of the networked hardware components based on the determined functional category of the one or more networked hardware components.

In yet another embodiment, a system includes a server configured to: determine a configuration of one or more networked hardware components; determine a usage level associated with one or more of the networked hardware components; and determine a functional category of one or more of the networked hardware components based at least in part on the configuration of the one or more networked hardware components and the usage level associated with the one or more networked hardware components; and one or more of: output a suggested configuration of one or more of the networked hardware components based on the determined functional category of the one or more networked hardware components; and configure of one or more of the networked hardware components based on the determined functional category of the one or more networked hardware components.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of systems and techniques configured to ensure individualized system data are properly installed, associated, and/or updated with respect to a particular computer system and/or particular hardware component(s) of the computer system, as well as related systems and methods.

In one general embodiment, a computer program product includes: a computer readable medium having stored thereon computer readable program instructions configured to cause a processor of a computer system to: determine a configuration of one or more networked hardware components; determine a usage level associated with one or more of the networked hardware components; determine a functional category of one or more of the networked hardware components based at least in part on the configuration of the one or more networked hardware components and the usage level associated with the one or more networked hardware components; and one or more of: output a suggested configuration of one or more of the networked hardware components based on the determined functional category of the one or more networked hardware components; and configure of one or more of the networked hardware components based on the determined functional category of the one or more networked hardware components.

In another general embodiment, a method includes: determining a configuration of one or more networked hardware components; determining a usage level associated with one or more of the networked hardware components; determining a functional category of one or more of the networked hardware components based at least in part on the configuration of the one or more networked hardware components and the usage level associated with the one or more networked hardware components; and one or more of: outputting a suggested configuration of one or more of the networked hardware components based on the determined functional category of the one or more networked hardware components; and configuring of one or more of the networked hardware components based on the determined functional category of the one or more networked hardware components.

In yet another general embodiment, a system includes a server configured to: determine a configuration of one or more networked hardware components; determine a usage level associated with one or more of the networked hardware components; and determine a functional category of one or more of the networked hardware components based at least in part on the configuration of the one or more networked hardware components and the usage level associated with the one or more networked hardware components; and one or more of: output a suggested configuration of one or more of the networked hardware components based on the determined functional category of the one or more networked hardware components; and configure of one or more of the networked hardware components based on the determined functional category of the one or more networked hardware components.

General Computing Concepts

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, and data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

Figure 1:
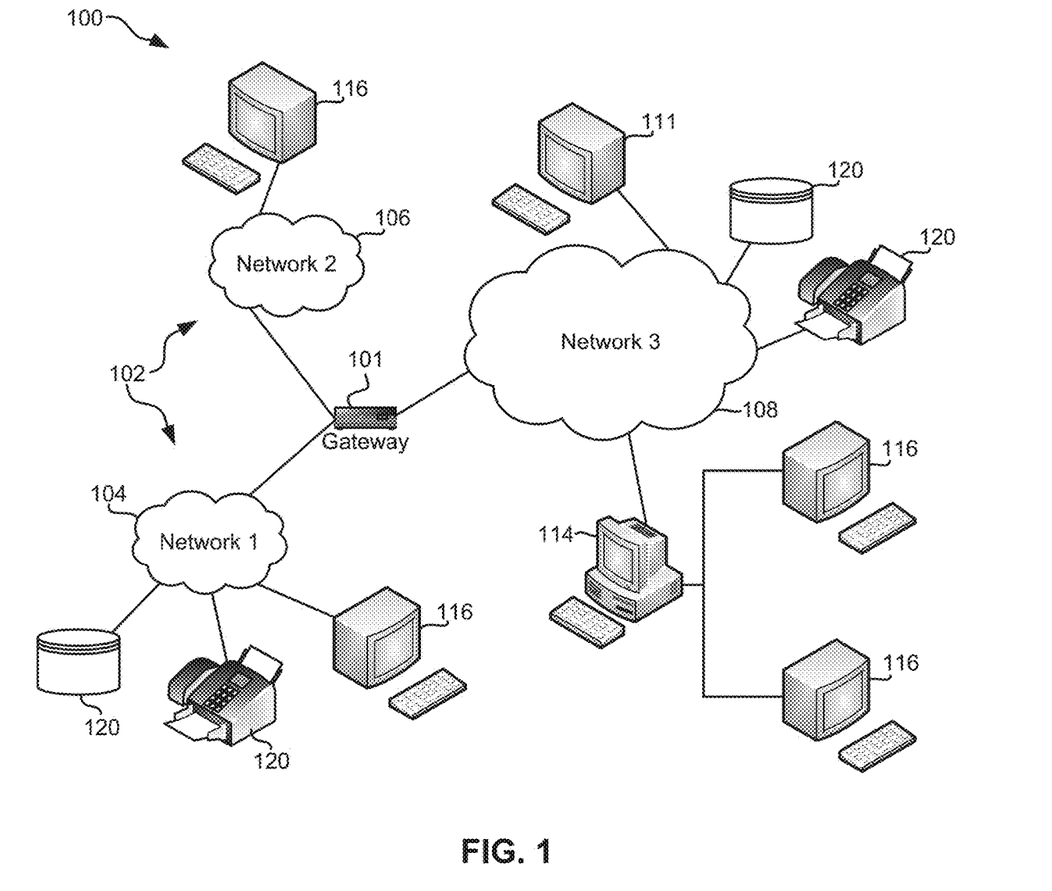
FIG. 1 is a schematic drawing of a computer network environment, according to one approach.

FIG. 1 illustrates an architecture 100, in accordance with one embodiment. As an option, the present architecture 100 may be implemented in conjunction with features from any other embodiment listed herein, such as those described with reference to the other FIGS. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber c, etc.) between the systems operating in the cloud, but other techniques of connecting the systems may also be used.

Figure 2:
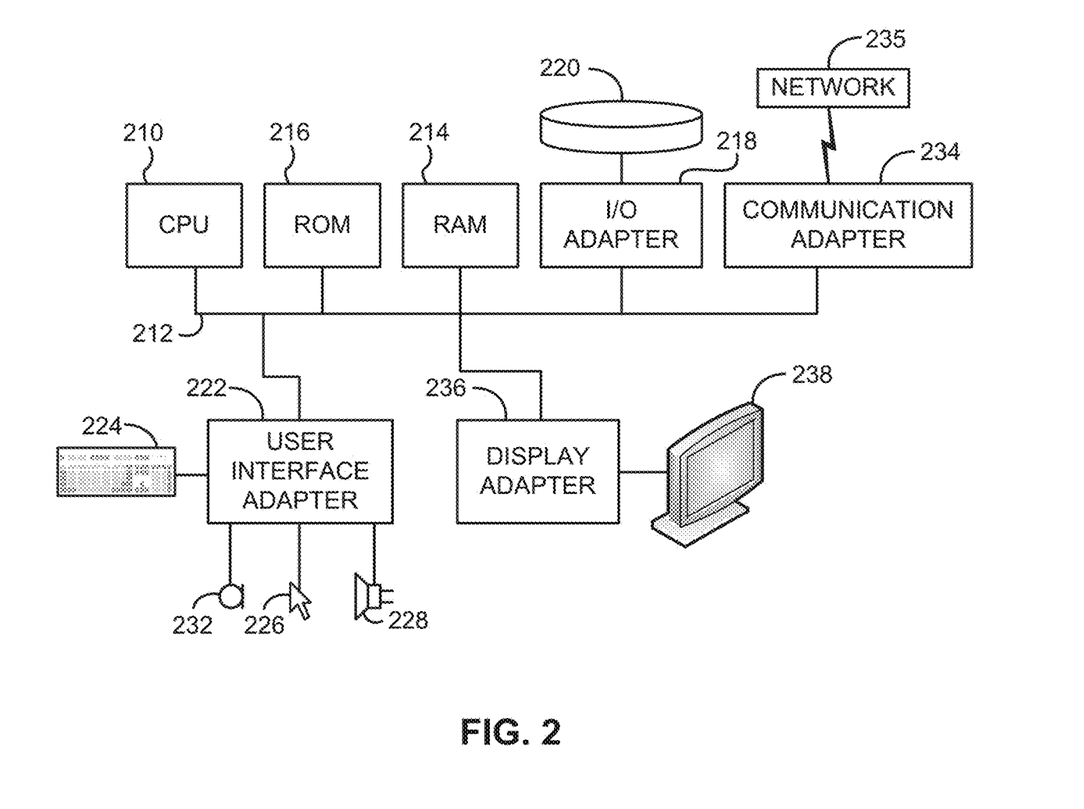
FIG. 2 depicts a simplified schematic of a computing workstation, according to one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
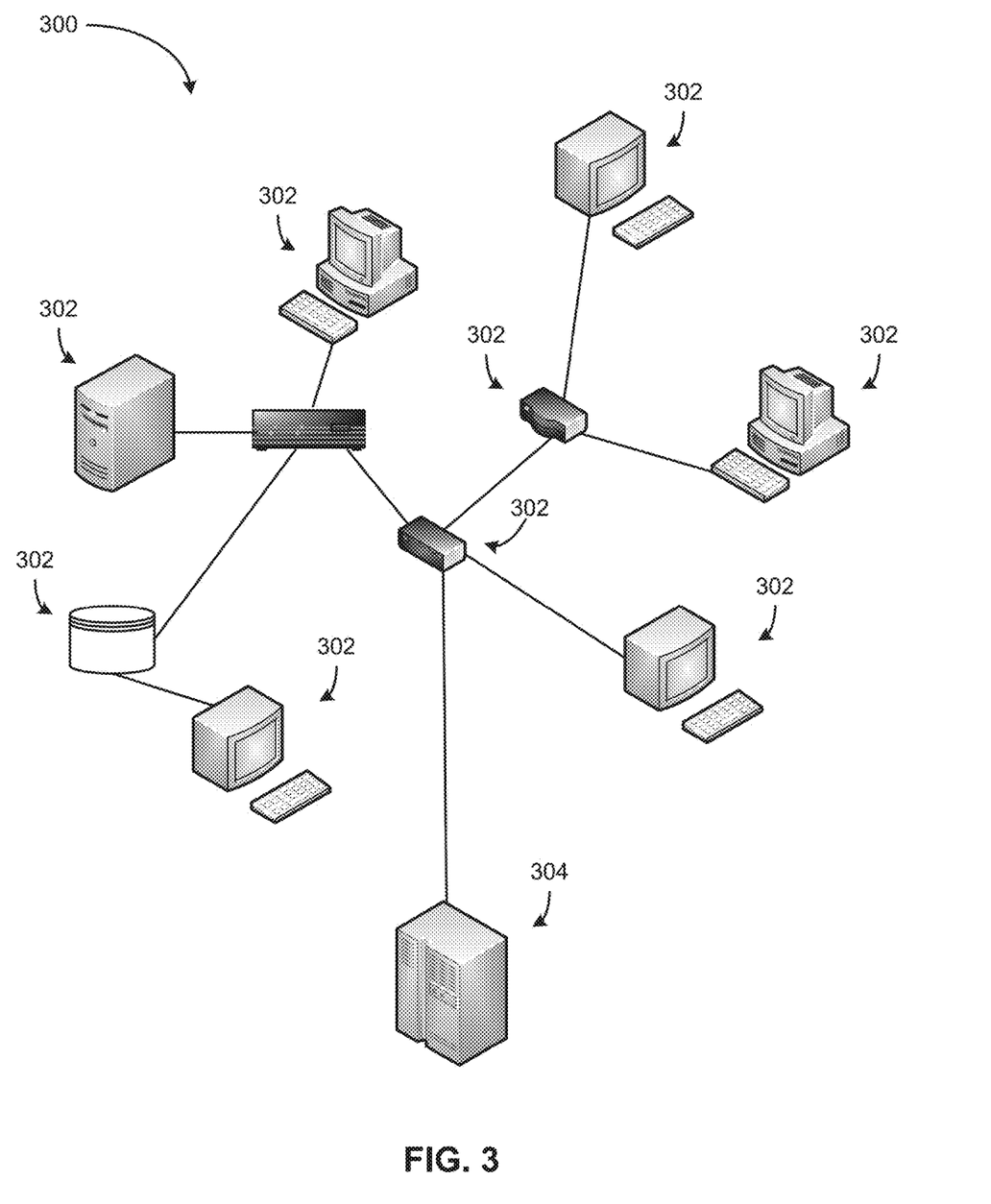
FIG. 3 depicts an exemplary network environment, according to one embodiment.

In one embodiment, and as shown in FIG. 3, the presently disclosed inventive concepts may be implemented in a network environment 300 such as a compute cluster, a storage area network (SAN), a LAN, a WAN, or any other suitable environment including a plurality of components 302 (preferably hardware components but optionally including one or more virtualized components in various embodiments) communicatively coupled to a server 304 such as a management server.

In one approach, the architecture 100 shown in FIG. 1 may be considered an illustrative embodiment of a network environment 300, and/or the representative hardware environment shown in FIG. 2 may be considered an exemplary embodiment of a hardware component 302 and/or server 304.

The network environment 300 includes a plurality of components 302, which may include one or more of servers, routers, switches, data storage devices, compute nodes (preferably including a memory and a processor or processors), workstations, bridges, etc. as would be understood by a person having ordinary skill in the art upon reading the present descriptions.

In general, and according to preferred embodiments, the server 304 is a management server configured to survey the components 302 of the network environment 300, determine configuration information for the various components 302, and build profile(s) for different component types. In various embodiments, component types may include compute components (e.g. data processing nodes or clusters, workstations, etc.), management components (e.g. filesystem servers, web servers, etc.), networking components (e.g. switches, routers, bridges, ports, etc.), storage components (e.g. HDD-based storage, SSD-based storage, tape-based storage, memory-based storage, etc.), or any other suitable type of component for inclusion in various different types of network architectures. In more approaches, component types may be defined or determined based on a unique context of the network environment 300.

Preferably, each component type has a corresponding profile characterized by a unique combination of component features, e.g. speed, type, and/or number of processors, type and/or amount of memory, type and/or amount of storage space, bandwidth capacity, etc. as would be understood by a person having ordinary skill in the art upon reading the present descriptions.

For instance, according to one exemplary embodiment, components 302 being characterized by having a number, type, and/or speed of processor(s) above a particular threshold may be considered compute components. The threshold may be defined by a system administrator, or set to a predefined value such as at least 8 processors (preferably in a single core), processors having a clock speed of at least 3 GHz, a number of transistors greater than a particular threshold (e.g. 4 billion transistors), etc. as would be understood by a person having ordinary skill in the art upon reading the present disclosures. Of course, the values may be defined according to the context of the network environment and the foregoing examples should be considered illustrative of different embodiments within the scope of the presently disclosed inventive concepts.

In another example, components 302 having a particular amount or type of storage space may be considered storage components. As note above regarding compute components, the amount of storage space may be defined by a particular threshold, and components 302 meeting or exceeding the threshold may be considered storage components. For instance, components 302 having 8 or more terabytes (TB) of space may be considered storage components. Similarly, components 302 having a particular type of storage, such as tape-based storage, may be designated storage components.

In yet another example, network components may be characterized by a particular bandwidth greater than or equal to a particular threshold bandwidth.

As will be understood by those having ordinary skill in the art, in various approaches industry standards or conventions at the time of network environment configuration may be used or taken into account in defining the appropriate thresholds by which to distinguish components of different types.

Similarly, combinations of features and thresholds may be employed to distinguish different types of components, and the combinations may require a particular value above a threshold, a particular value below a threshold, multiple values above or below a particular threshold, etc. in various approaches. For instance, in one embodiment compute components may be characterized by at least 8 cores, but no more than 2 TB of storage space, while storage components may be characterized by less than 8 cores, and 8 TB or more of storage space.

In preferred approaches, at least some of the component types may also be determined based at least in part on usage information, such as a load carried over time by a particular processor, amount of storage utilization (e.g. relative to total capacity), amount of I/O, etc. as would be understood by a person having ordinary skill in the art. Indeed, in one approach components of a similar type (e.g. different types of compute components) may be further distinguished on the basis of usage information.

The server 304 preferably utilizes the determined profiles to distinguish between different types of component 302 present in the network environment 300. Components 302 having similar configurations may be assigned to common configuration "pools" and optionally configured in a same or similar manner based on the determined component type.

In response to determining component types in this manner, the server 304 therefore preferably normalizes configuration across components 302 of a same or similar type. Normalizing configuration may include automatically or semi-automatically (e.g. based on user and/or administrator approval of a proposed configuration, which may be displayed to the user and/or administrator using a prompt in a configuration user interface) updating or installing firmware, operating system(s) or operating system components, applications, configuration parameters, etc. across components 302 having to a particular same or similar) component type.

In more approaches, normalization may include automatically or semi-automatically propagating a user or admin-instructed configuration change, update, etc. applied to one or more components 302 having a particular component type to other components 302, preferably other components having the particular component type.

By implementing the foregoing general approach, new components 302 may also be added to the network environment 300 and configured according to type in an automated or semi-automated manner.

Accordingly, in one embodiment a system includes a server configured to: determine a configuration of one or more networked hardware components; determine a usage level associated with one or more of the networked hardware components; and determine a functional category of one or more of the networked hardware components based at least in part on the configuration of the one or more networked hardware components and the usage level associated with the one or more networked hardware components.

In more embodiments, the server may be configured to determine the configuration of one or more of the networked hardware components based on vital product data (VPD) corresponding to the one or more networked hardware components. The VPD may include or otherwise indicate one or more of: a number of processors of one of the networked components; a clock speed of one or more processors of the networked components; a type of processor(s) of one of the networked components; a number of memory units of one of the networked components; a type of memory unit(s) of one of the networked components; a capacity of one or more memory units of one of the networked components; a number of bussed components (e.g. PCIE cards or the like) of one of the networked components; a type of bussed component(s) of one of the networked components; a capacity of one or more storage devices of one of the networked components; and a type of storage device(s) of one of the networked components.

The server may additionally and/or alternatively be configured to determine the configuration of one or more of the networked hardware components based on reading a VPD register of the one or more networked hardware components.

The server may also be configured to determine the usage level associated with one or more of the networked hardware components based in whole or in part on one or more of: an input/output (I/O) bandwidth of the one or more networked hardware components; an I/O traffic level of the one or more of the networked hardware components; a processor usage of the one or more of the networked hardware components; a memory usage of the one or more of the networked hardware components; and a number of storage accesses per unit time of the one or more of the networked hardware components.

The server may be configured to determine the configuration, the usage level, and the functional category of the one or more networked hardware components in response to detecting a new hardware component being added to the network; and the one or more networked hardware components for which the configuration, the usage level, and the functional category are determined preferably include the new hardware component.

Moreover, in various embodiments determining the functional category of the new hardware component may include either adding the new hardware component to an existing functional category or defining a new functional category.

In addition, the server may be configured to determine configuration parameters for one or more of the networked hardware components based on the determined functional category of the one or more networked hardware components.

The server may be configured to normalize configuration parameters across a plurality of the one or more networked components based on determining the plurality of the one or more networked components are characterized by a same functional category. In this context, normalizing the configuration parameters may include one or more of: installing or updating firmware on the plurality of the one or more networked components; installing or updating an operating system of the plurality of the one or more networked components; and setting one or more configuration parameters for the plurality of the one or more networked components.

The determined functional category of the various components may be selected from a group including compute components; management components; storage components; and networking components.

Figure 4:
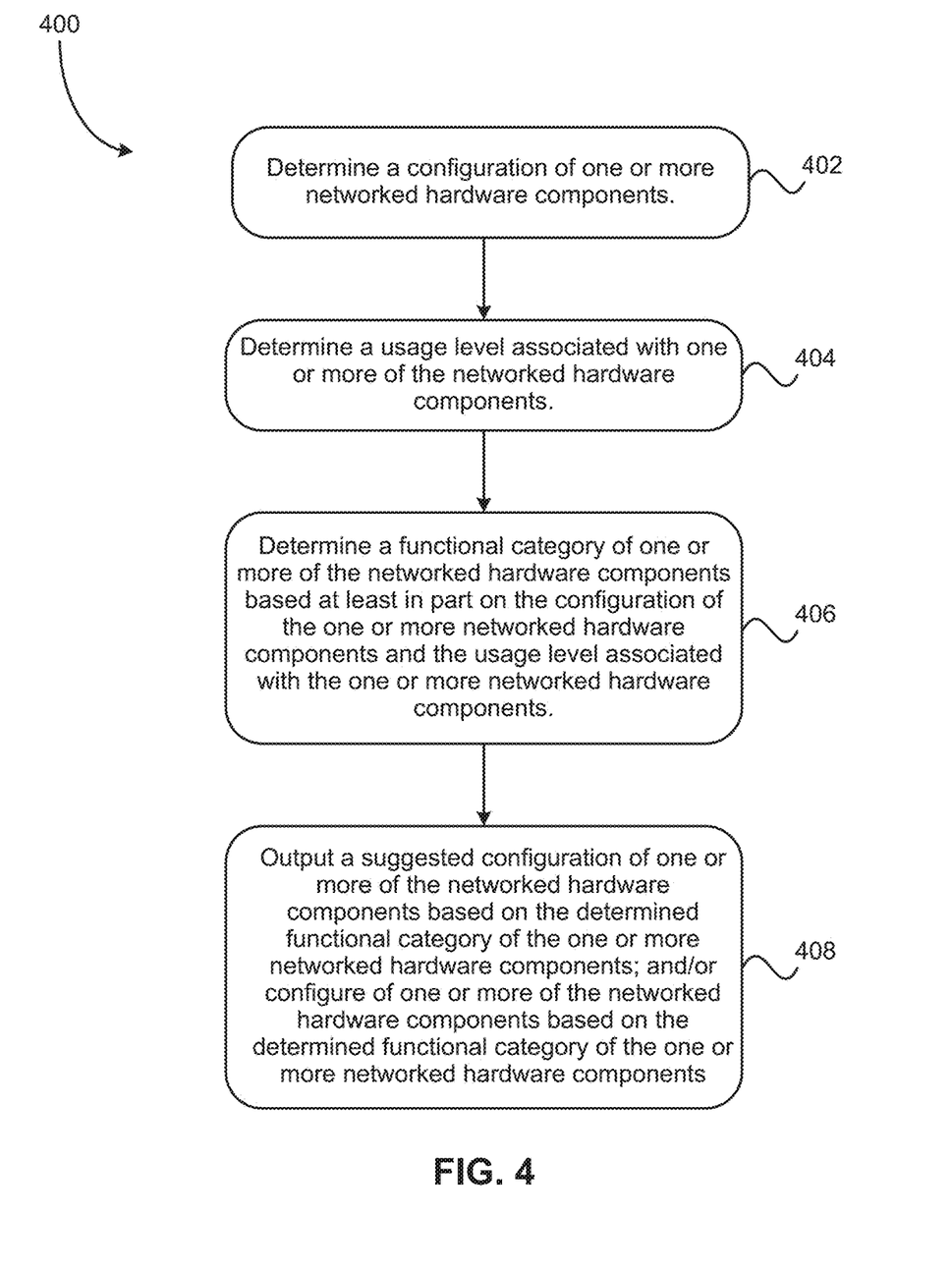
FIG. 4 shows a flowchart of a method, according to one approach.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a management server of a network environment, or some other device having one or more processors therein such as a cluster. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a configuration of one or more networked hardware components is determined.

Method 400 also includes determining a usage level associated with one or more of the networked hardware components in operation 404, and determining a functional category of one or more of the networked hardware components based at least in part on the configuration of the one or more networked hardware components and the usage level associated with the one or more networked hardware components in operation 406.

Method 400 also includes operation 408, in which a suggested configuration of one or more of the networked hardware components is output, e.g. to a display of the server or another networked hardware component, based on the determined functional category of the one or more networked hardware components. Additionally or alternatively, operation 408 includes automatically configuring one or more of the networked hardware components based on the determined functional category of the one or more networked hardware components, in various embodiments.

Of course, as noted above, method 400 may include one or more additional and/or alternative operations, features, functions, etc. For instance, in various approaches, method 400 may include any combination of the following.

In one instance, the method 400 may include determining one or more configuration parameters for one or more of the networked hardware components based on the determined functional category of the one or more networked hardware components.

In another instance, the method 400 may include normalizing one or more configuration parameters across a plurality of the one or more networked components based on determining the plurality of the one or more networked components are characterized by a same functional category.

In yet another instance, the method 400 may include outputting a suggested configuration to a display coupled to the server, the suggested configuration corresponding to one or more of the networked components being characterized by a same functional category; and receiving user feedback confirming, modifying or refuting the suggested configuration. Preferably, for semi-automated approaches the normalizing is performed in response to receiving user feedback confirming the suggested configuration.

However, fully-automated approaches may be employed without departing from the scope of the presently disclosed inventive concepts. Accordingly, method 400 may include automatically configuring the one or more networked components in response to receiving the user feedback refuting the suggested configuration.

In still yet another instance, the method 400 may include determining the usage level associated with one or more of the networked hardware components is based in whole or in part on one or more of: an input/output (I/O) bandwidth of the one or more networked hardware components; an I/O traffic level of the one or more of the networked hardware components; a processor usage of the one or more of the networked hardware components; a memory usage of the one or more of the networked hardware components; and a number of storage accesses per unit time of the one or more of the networked hardware components.

In more instances, the method 400 may include determining the configuration of one or more of the networked hardware components is based at least in part on vital product data (VPD) corresponding to the one or more networked hardware components.

As will be understood by those having ordinary skill in the art upon reading the instant descriptions, any feature or functionality disclosed herein may be optionally implemented in a computer program product. According to these embodiments, a computer program product may include a computer readable medium having stored thereon computer readable program instructions configured to cause a processor of a computer system to: determine a configuration of one or more networked hardware components; determine a usage level associated with one or more of the networked hardware components; and determine a functional category of one or more of the networked hardware components based at least in part on the configuration of the one or more networked hardware components and the usage level associated with the one or more networked hardware components.

Of course the computer program product may additionally and/or alternatively include any combination of functions or features as described herein, in more approaches.

By implementing the aforementioned techniques, features, and components, in various embodiments, the presently disclosed inventive concepts advantageously improve the function of network environments and associated systems by ensuring proper configuration of various different types of components in the network environment. As will be appreciated by those having ordinary skill in the art upon reading the present descriptions, the function of the various components may be improved by ensuring appropriate firmware, operating systems and/or applications, and/or configuration parameters are in place.

This, in turn, solves the problems associated with manual and user-mediated network environment configuration by suppressing or eliminating the occurrence of failed jobs, failed data transmissions, broken communications pathways, I/O bottlenecks, etc. as would be understood by a person having ordinary skill in the art upon reading the present disclosures. As will be further understood by skilled artisans reading the present disclosure, the suppression or elimination of failures, breaks, and bottlenecks improves the overall computational efficiency of the system as a whole, enabling faster, more efficient processing, storage, and transfer of data therein.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation Thus, the breadth and scope of an embodiment of the present invention should not be limited by any of the above-described exemplary embodiments, but should be defined only in accordance with the following claims and their equivalents.

What is claimed is:

1. A computer program product, comprising: a computer readable storage medium having stored thereon computer readable program instructions configured to cause a processor of a computer system to:
   determine a configuration of one or more networked hardware components;
   determine a usage level associated with one or more of the networked hardware components;
   determine a functional category of one or more of the networked hardware components from among a plurality of predetermined functional categories, the determination based at least in part on the configuration of the one or more networked hardware components and the usage level associated with the one or more networked hardware components; and
   automatically configure of one or more of the networked hardware components based on the determined functional category of the one or more networked hardware components.

2. The computer program product as recited in claim 1, comprising computer readable program instructions configured to cause the processor of the computer system to: determine the configuration of one or more of the networked hardware components based on vital product data (VPD) corresponding to the one or more networked hardware components.

3. The computer program product as recited in claim 2, wherein the VPD comprise one or more of:
   a number of memory units of one of the networked components;
   a type of memory unit(s) of one of the networked components;
   a number of bussed components of one of the networked components;
   a type of bussed component(s) of one of the networked components;
   and
   a type of storage device(s) of one of the networked components.

4. The computer program product as recited in claim 2, comprising computer readable program instructions configured to cause the processor of the computer system to: determine the configuration of one or more of the networked hardware components based on reading a VPD register of the one or more networked hardware components.

5. The computer program product as recited in claim 1, comprising computer readable program instructions configured to cause the processor of the computer system to: determine the usage level associated with one or more of the networked hardware components based on one or more of:
   an input/output (I/O) bandwidth of the one or more networked hardware components;
   an I/O traffic level of the one or more of the networked hardware components;
   a processor usage of the one or more of the networked hardware components;
   a memory usage of the one or more of the networked hardware components; and
   a number of storage accesses per unit time of the one or more of the networked hardware components.

6. The computer program product as recited in claim 1, comprising computer readable program instructions configured to cause the processor of the computer system to: determine the configuration, the usage level, and the functional category of the one or more networked hardware components in response to detecting a new hardware component being added to the network; and
   wherein the one or more networked hardware components for which the configuration, the usage level, and the functional category are determined comprises the new hardware component; and
   wherein determining the functional category of the new hardware component comprises either adding the new hardware component to an existing functional category or defining a new functional category.

7. The computer program product as recited in claim 1, comprising computer readable program instructions configured to cause the processor of the computer system to: determine configuration parameters for one or more of the networked hardware components based on the determined functional category of the one or more networked hardware components; and
   normalize the configuration parameters across a plurality of the one or more networked components based on determining the plurality of the one or more networked components are characterized by a same functional category; and
   wherein normalizing the configuration parameters comprises one or more of:
      installing or updating firmware on the plurality of the one or more networked components;
      installing or updating an operating computer program product of the plurality of the one or more networked components; and
      setting one or more configuration parameters for the plurality of the one or more networked components.

8. The computer program product as recited in claim 1, wherein the plurality of predetermined functional categories comprise: compute components; management components; storage components; and networking components.

9. A method, comprising:
   determining a configuration of one or more networked hardware components;
   determining a usage level associated with one or more of the networked hardware components; and
   determining a functional category of one or more of the networked hardware components from among a plurality of predetermined functional categories, the determination based at least in part on the configuration of the one or more networked hardware components and the usage level associated with the one or more networked hardware components; and
   automatically configuring of one or more of the networked hardware components based on the determined functional category of the one or more networked hardware components.

10. The method as recited in claim 9, comprising determining one or more configuration parameters for one or more of the networked hardware components based on the determined functional category of the one or more networked hardware components.

11. The method as recited in claim 9, comprising normalizing one or more configuration parameters across a plurality of the one or more networked components based on determining the plurality of the one or more networked components are characterized by a same functional category.

12. The method as recited in claim 11, comprising outputting a suggested configuration to a display coupled to a server, the suggested configuration corresponding to one or more of the networked components being characterized by a same functional category; and
   receiving user feedback confirming, modifying or refuting the suggested configuration.

13. The method as recited in claim 12, wherein the normalizing is performed in response to receiving user feedback confirming the suggested configuration.

14. The method as recited in claim 12, comprising automatically configuring the one or more networked components in response to receiving the user feedback refuting the suggested configuration.

15. The method as recited in claim 9, wherein determining the usage level associated with one or more of the networked hardware components is based on one or more of:
   an input/output (I/O) bandwidth of the one or more networked hardware components;
   an I/O traffic level of the one or more of the networked hardware components;
   a processor usage of the one or more of the networked hardware components;
   a memory usage of the one or more of the networked hardware components; and
   a number of storage accesses per unit time of the one or more of the networked hardware components.

16. The method as recited in claim 9, wherein determining the configuration of one or more of the networked hardware components is based at least in part on vital product data (VPD) corresponding to the one or more networked hardware components.

17. A system, comprising a server configured to:
   determine a configuration of one or more networked hardware components;
   determine a usage level associated with one or more of the networked hardware components; and
   determine a functional category of one or more of the networked hardware components based at least in part on the configuration of the one or more networked hardware components and the usage level associated with the one or more networked hardware components; and
   one or more of:
      output a suggested configuration of one or more of the networked hardware components based on the determined functional category of the one or more networked hardware components; and
      configure of one or more of the networked hardware components based on the determined functional category of the one or more networked hardware components.

18. The system as recited in claim 17, wherein the functional category of the one or more of the networked hardware components is selected from among a plurality of functional categories comprising: compute components; management components;
   storage components; and networking components;
   wherein the compute components are selected from the group consisting of: data processing nodes, data processing clusters, and workstations;
   wherein the management components are selected from the group consisting of: filesystem servers and web servers;
   wherein the storage components are selected from the group consisting of: HDD-based storage, SSD-based storage, tape-based storage, and memory-based storage; and
   wherein the networking components are selected from the group consisting of: switches, routers, bridges, and ports.

19. The method as recited in claim 9, wherein the plurality of predetermined functional categories comprise: compute components; management components; storage components; and networking components;
   wherein the compute components are characterized by having at least 8 cores each characterized by a clock speed of at least 3 GHz;
   wherein the storage components are characterized by having at least 8 TB of storage space;
   wherein the networking components are characterized by a bandwidth capability greater than or equal to a predetermined threshold bandwidth; and
   wherein each management component is a server.

20. The computer program product as recited in claim 1, comprising computer readable program instructions configured to cause the processor of the computer system to:
   determine configuration parameters for one or more of the networked hardware components based on the determined functional category of the one or more networked hardware components;
   determine the configuration of one or more of the networked hardware components based on vital product data (VPD) in a VPD register of the one or more networked hardware components, the VPD corresponding to the one or more networked hardware components; and
   determine the usage level associated with one or more of the networked hardware components based on one or more of:
      an input/output (I/O) bandwidth of the one or more networked hardware components;
      an I/O traffic level of the one or more of the networked hardware components;

a processor usage of the one or more of the networked hardware components;
a memory usage of the one or more of the networked hardware components; and
a number of storage accesses per unit time of the one or more of the networked hardware components; and
wherein the plurality of predetermined functional categories comprise: compute components; management components; storage components; and networking components;
wherein the compute components are characterized by having at least 8 cores each characterized by a clock speed of at least 3 GHz;
wherein the storage components are characterized by having at least 8 TB of storage space;
wherein the networking components are characterized by a bandwidth capability greater than or equal to a predetermined threshold bandwidth;
wherein each management component is a server;
wherein determining the configuration, the usage level, and the functional category of the one or more networked hardware components is performed in response to detecting a new hardware component being added to the network; and
wherein the one or more networked hardware components for which the configuration, the usage level, and the functional category are determined comprises the new hardware component.

* * * * *